Patented May 4, 1948

2,440,768

UNITED STATES PATENT OFFICE 2,440,768

PRODUCTION OF TETRACHLOROETHYLENE

John W. Churchill, Niagara Falls, N. Y., assignor to The Mathieson Alkali Works, Inc., New York, N. Y., a corporation of Virginia No Drawing. Application March 9, 1945, Serial No. 581,931

3 Claims. (Cl. 260—654)

This invention is concerned with the production of tetrachloroethylene by the chlorination of methylene chloride.

It is well known that under suitable conditions methane and its lower chlorination products may be chlorinated to carbon tetrachloride. It is likewise known that the pyrolysis of carbon tetrachloride at temperatures above 1100° C. and particularly at 1300–1400° C. yields tetrachloroethylene and chlorine according to the equation:

$$2CCl_4 \rightarrow C_2Cl_4 + 2Cl_2 \qquad (1)$$

Quartz or graphite tubes must be used for effecting reaction (1) since chlorine attacks metals vigorously at these high temperatures. The method is further complicated by the formation of large percentages of hexachlorobenzene and by the recombination of chlorine and tetrachloroethylene to form hexachloroethane during cooling and condensation of the products.

It is furthermore known that chloroform decomposes above 400° C. to produce tetrachloroethylene, hexachloroethane, hexachlorobenzene, hydrogen chloride, chlorine and soot. The yields of tetrachloroethylene in this process are low.

It is an object of the present invention to provide a process for the manufacture of tetrachloroethylene which does not possess the disadvantages of forming free chlorine which attacks metals at high temperatures and of the formation of large percentages of sooty deposits.

In accordance with my improved process, these objects are attained and other advantages accrue, as will appear from the following detailed description thereof, by effecting the pyrolysis of methylene chloride in the presence of chlorine at a temperature of about 400–700° C. While I cannot state with certainty the chemical reaction or reactions involved and do not intend to be bound by any theory, it is my present belief that the reaction may be represented as follows:

$$2Cl_2 + 2CH_2Cl_2 \rightarrow C_2Cl_4 + 4HCl \qquad (2)$$

This equation illustrates the principal reaction of my improved process and it is to be noted that in contrast with the ordinary pyrolysis of carbon tetrachloride, for example, no free chlorine is formed as a product and it is not necessary to provide apparatus of materials which resist the action of chlorine at the higher temperatures. Furthermore, as appears from the above Equation 2 and from actual experiment, no objectionable amount of carbon is formed in my process. Thus, the present process is a distinct improvement over the pyrolysis of chloroform, for example, which yields large quantities of carbonaceous deposits. Further, much lower temperatures may be employed than are required for the pyrolysis of carbon tetrachloride to tetrachloroethylene.

That my process does not involve the chlorination of lower chlorination products of methane to chloroform and pyrolysis of the latter, is indicated by the fact that, as pointed out above, the latter reaction yields large quantities of soot whereas it is a characteristic of my process that no objectionable carbonaceous products are formed. Furthermore, the chlorination of methylene chloride in the presence of a chlorination catalyst, such as barium chloride, in the temperature range of my process, 400–700° C. yields 20% of chloroform, based on the methylene chloride charged. If chloroform were an intermediate in my process, it is reasonable to assume that some would appear in the products, whereas actually none has been found.

It appears that my present process does not involve the chlorination of methylene chloride to carbon tetrachloride followed by its thermal decomposition, since the latter decomposes to yield tetrachloroethylene only at temperatures in excess of 1100° C. whereas, as shown by the following examples, at considerably lower temperatures, namely 400–700° C., advantageous yields of tetrachloroethylene are obtained by my process.

The chlorine and methylene chloride for use according to my invention may be obtained from any convenient source. It is not essential that they be of extremely high purity although it is preferable that they not be highly contaminated with materials which would render unduly difficult the separation of the desired product from the crude mixture initially obtained. Since according to my process, both of the reactants are used in the vapor phase, non-volatile impurities readily separable by distillation may be present in the starting materials as they will be separated upon vaporizing the reactants.

In general, it is desirable to charge to my process chlorine and methylene chloride, or its equivalent, in molar proportions of about 1:1 to about 4:1. Substantially smaller ratios of chlorine decrease the yield of the desired product and substantially larger ratios of chlorine do not serve to increase the yield thereof materially.

In carrying out the process of my invention, the chlorine and methylene chloride are passed together through a reaction chamber, advantageously filled with Raschig rings or glass beads, or other surface-increasing packing material, and heated to a temperature from 400–700° C. In the early stages of the operation the reaction has been found to proceed relatively slowly, but as the operation continues a thin carbonaceous deposit has been found to form slowly on the inner walls of the reaction chamber and on the glass beads or other packing material therein. This carbonaceous deposit appears strongly to catalyze the reaction, for as soon as a small amount of this carbonaceous material has been deposited in the reaction chamber, a greatly increased rate of reaction is attained.

The formation and deposition of the carbonaceous material appears to be favored by passing through the reaction chamber at the reaction temperature a mixture of chlorine and methylene chloride, in which mixture the molar ratio of chlorine to methylene chloride is less than 1. Accordingly, in starting the operation with a clean apparatus, it is desirable to reduce the proportion of chlorine used below that found most desirable in normal operation, so as to hasten the deposition of the carbonaceous material. After the deposit of carbonaceous material has been formed, the molecular ratio of chlorine to methylene chloride may, with advantage, be increased to at least about 1:1, and maintained at that ratio throughout the operation. After the deposition of the carbonaceous deposit, the extent and rate of conversion have been found to be materially increased over that obtained in the absence of the carbonaceous deposit under otherwise similar operating conditions.

In subsequent runs in apparatus in which the carbonaceous deposit from previous runs has been permitted to remain in the apparatus, high yields are immediately obtained without reduction of the chlorine-methylene chloride ratio. When using chlorine and methylene chloride in proportions equal to or in excess of a ratio of 1:1, no objectionable accumulation of carbonaceous deposit in the reaction chamber has been experienced.

I cannot state with certainty the nature of the carbonaceous deposit, but it has been found to contain considerable proportions of chlorine, for instance, one sample was found to contain 27% of chlorine. It is hard and shiny and is remarkably effective in increasing the extent and rate of conversion of the reactants to the desired product.

The contact time of the reactants at the desired temperatures in my process does not appear to be particularly critical and may vary from one second or less up to as much as ten seconds or more. Generally satisfactory results are obtained using contact times of about two to four seconds.

The process of my invention may be effected by passing an intimate admixture of chlorine and methylene chloride in suitable proportions through a reaction zone wherein the mixture is heated to a temperature of 400–700° C. and preferably about 400–500° C. At such temperatures, in the presence of the above described carbonaceous deposit, the reaction proceeds rapidly as indicated by the examples subsequently to be described. The products are passed from the reaction zone to a separating operation, for example, fractional condensation by cooling or substantially complete condensation of the reaction products boiling above room temperature followed by fractional distillation.

The mixture of chlorine and methylene chloride passed to the reaction zone may be prepared in any suitable manner and, in the dark, there is no danger of a premature reaction of the reagents before reaching the reaction chamber. In fact it is frequently desirable to preheat the mixed gases, for example, by indirect heat exchange with the products of the reaction.

The reactor may consist of a glass or metal tube positioned within a furnace adapted to heat the tube to the reaction temperature. The reaction may be effected in an unfilled tube but better results follow, as has been indicated, by filling the tube with a material, as glass or porcelain beads or fragments, Raschig rings, etc. providing increased heat exchange surfaces and greater surface for deposition of the carbonaceous coating.

The hot reaction products passing from the reaction zone may be cooled, for example, by heat exchange with the mixture of gases being charged to the reaction chamber, and thereafter may be fractionally condensed to recover the tetrachloroethylene, and any other carbon halides, from hydrogen chloride and any unreacted chlorine. If desired, the tetrachloroethylene may be fractionally condensed from the gases leaving the reaction chamber, and any other products, together with unreacted methylene chloride or chlorine may be recycled to the reaction zone.

It is not essential that the two reactants be admixed before entering the reaction zone but both may be separately charged thereto. In such case, it is advantageous to preheat the reactants directly, or by means of heat exchange with the reaction products, to a temperature approaching the reaction temperature before passing to the reaction zone. Under these conditions, suitable means should be provided for immediate and thorough mixing of the reactants in the reaction chamber.

My present process will be illustrated by the following specific examples of its application. It will be understood, however, that the invention is not limited to the specific operating conditions of these examples. All percentages of reaction products given in the following examples are based on the carbon content of the compounds charged to and recovered from the respective operations.

*Example I*

A mixture of equal moles of chlorine and methylene chloride vapors were passed into a reaction zone comprising a glass tube filled with glass beads, the beads and inner walls of the tube being covered with a hard, shiny carbonaceous deposit resulting from a previous operation using a reduced proportion of chlorine as previously described. The reaction chamber was maintained at a temperature of 580–600° C. and the contact time was 1.92 seconds. The products of the reaction were condensed and fractionated and yielded the following materials in the specified percentages calculated as just described:

| | Per cent |
|---|---|
| Tetrachloroethylene | 33.8 |
| Carbon tetrachloride | 17.5 |
| Hexachloroethane | 14.5 |
| Hexachlorobenzene | 32.5 |

*Example II*

There was charged into the same apparatus, without removal of the carbonaceous deposit, an equimolecular mixture of chlorine and methylene chloride under such conditions that the contact time was 1.99 seconds, and the temperature maintained at 450–510° C. By condensation and fractional distillation, the following products were obtained in the indicated proportions:

| | Per cent |
|---|---|
| Tetrachloroethylene | 47.4 |
| Carbon tetrachloride | 26.1 |

Example III

Chlorine and methylene chloride in a molecular ratio of 1:1 were charged to a reaction zone, substantially as described in Example I, under such conditions that the contact time was 2.27 seconds at a temperature of 650–670° C. The analysis of the products showed:

| | Per cent |
|---|---|
| Tetrachloroethylene | 25.9 |
| Carbon tetrachloride | 24.3 |
| Hexachlorobenzene | 14.2 |

Example IV

An equimolecular mixture of chlorine and methylene chloride was charged to the same reaction zone as used in Example I. The contact time was 2.11 seconds and the reaction temperature was 450–460° C. Under these conditions an increased yield of tetrachloroethylene over that shown in Example III was obtained. The products on analysis were found to be:

| | Per cent |
|---|---|
| Tetrachloroethylene | 34.0 |
| Carbon tetrachloride | 25.4 |
| Hexachlorobenzene | 27.3 |

Example V

Using a chlorine-methylene chloride ratio of 4:1 and a contact time of 2.28 seconds at a temperature of 410° C. in the apparatus of Example I, a still further increased yield of tetrachloroethylene was obtained, as shown by the following analysis of the product:

| | Per cent |
|---|---|
| Tetrachloroethylene | 42.5 |
| Carbon tetrachloride | 34.3 |
| Hexachloroethane | 15.7 |

Example VI

Using the same apparatus and the same 4:1 ratio of chlorine to methylene chloride and a contact time of 2.25 seconds, the reaction temperature was raised to 600° C. and there was obtained a product containing the following components:

| | Per cent |
|---|---|
| Tetrachloroethylene | 29.1 |
| Carbon tetrachloride | 50.3 |
| Hexachloroethane | 22.2 |

Comparison of the preceding six examples shows that particularly advantageous yields of tetrachloroethylene are obtained at temperatures of 400–500° C., although even at temperatures approaching 700° C. considerable yields of the desired product are obtained. It will be observed that in the first four examples the chlorine-methylene chloride molar ratio was 1:1 and that in Examples I and II substantially the same contact time was employed. Under these conditions a better yield was obtained at 450–510° C. (Example II) than at 580–600° C. (Example I). Examples III and IV show similar contact times of 2.27 and 2.11 seconds, respectively, and the more advantageous yield is obtained in Example IV at 450–460° C. than at the higher temperature (650–670° C.) of Example III. Examples V and VI show that, with a chlorine-methylene chloride ratio of as high as 4:1 and almost identical contact times, a significantly better yield of tetrachloroethylene is obtained at 410° than at 600°.

Example VII

Using a chlorine-methylene chloride ratio of 2:1 at a reaction temperature of 400–410° C. and a contact time of 2.30 seconds, a product was obtained having the following composition:

| | Per cent |
|---|---|
| Tetrachloroethylene | 33.1 |
| Carbon tetrachloride | 37.8 |
| Hexachloroethane | 1.40 |
| Hexachlorobenzene | 27.7 |

Comparing Examples IV, V and VII, in which the contact time varied over the relatively narrow range of 2.11 to 2.30 seconds and the temperature varied over the relatively narrow range of 400–460° C., the yield of tetrachloroethylene appears to be increased by increasing the molar ratio of chlorine to methylene chloride to in excess of 2:1. At a 1:1 molar ratio the yield of tetrachloroethylene was 34.0% (Example IV) and at 2:1 it was 33.1% (Example VIII) while with a ratio of 4:1, the yield was 42.5% (Example V). The total yield of tetrachloroethylene plus hexachloroethane is about the same in Example IV, with a ratio of 1:1, as in Example V with a ratio of 4:1. The hexachloroethane is readily converted to tetrachloroethylene by known methods, but where higher yields of the former are objectionable it is usually desirable to operate at the lower ratios.

Example VIII

A mixture of chlorine and methylene chloride in a molar ratio of 1:1 was charged to a glass reaction chamber filled with glass beads covered with a carbonaceous deposit from earlier runs and heated to 575–580° C. The rates of flow were controlled to obtain a contact time of 2.48 seconds. The resulting product on analysis showed the following composition:

| | Per cent |
|---|---|
| Tetrachloroethylene | 25.5 |
| Carbon tetrachloride | 28.3 |
| Hexachlorobenzene | 37.9 |

Example IX

Two moles of chlorine per mole of methylene chloride was charged in this experiment to the reaction chamber described in Example VIII and maintained at a temperature of 500–510° C., the conditions being arranged to obtain a contact time of 3.30 seconds. On analysis the product was found to contain:

| | Per cent |
|---|---|
| Tetrachloroethylene | 52.4 |
| Carbon tetrachloride | 40.5 |

Example X

Using the same ratio of reactants and the same reaction temperature as in Example IX, but decreasing the contact time to 2.12 seconds, a product having the following composition was obtained:

| | Per cent |
|---|---|
| Tetrachloroethylene | 28.5 |
| Carbon tetrachloride | 25.1 |
| Hexachloroethane | 37.0 |
| Hexachlorobenzene | 2.4 |

Example XI

A product comprising 44% of tetrachloroethylene and 53% of carbon tetrachloride was obtained by charging a chlorine-methylene chloride mixture having a molar ratio of 1:1 where the contact time was of 5.79 seconds and the reaction temperature was 510–520° C.

Comparing Examples I and VIII, in which the ratios of reactants and reaction temperatures were substantially the same, and comparing Examples IX and X in both of which the ratio of reactants was 2:1, the effect of variations in the contact time on the yield of tetrachloroethylene appears not to follow a definite pattern. Example II differs from Example XI principally in the contact time which was 1.99 seconds in the former as compared with 5.79 seconds in the latter. The yield of tetrachloroethylene is not greatly different but the yield of carbon tetrachloride in Example XI was greater and for this reason higher contact times are usually less desirable. I usually prefer contact times of about two to four seconds, but an even shorter or more extended contact time may be used with advantage, say six seconds or more, and may be desirable depending upon other operating conditions. In normal operation, particularly where the reaction is effected in the presence of the carbonaceous deposit, the contact time should usually not exceed six seconds.

In each of the foregoing examples the reaction chamber used has been pre-coated with the previously described carbonaceous deposit by passing therethrough a mixture of chlorine and methylene chloride in molar proportions less than 1:1. Where a ratio of 1:1 or higher is used this carbonaceous deposit either does not form at all, or else forms extremely slowly at the operating temperature of 400 to 700° C. and the desired reaction is relatively slow. Once the reaction chamber has been coated with the carbonaceous deposit, as by such low ratio operation, the ratio may then be increased to 1:1 or higher and the desired reaction produces rapidly with a high yield and with little or no formation of further carbonaceous deposit, as illustrated by the foregoing examples.

Although I normally produced the carbonaceous deposit by reaction of chlorine and methylene chloride, it is within the scope of my invention to produce the deposit on the refractory packing and/or on the walls of the reactor using other sources of chlorine and carbon, chlorohydrocarbons other than methylene chloride, for example.

I claim:

1. A process for producing tetrachloroethylene from methylene chloride which comprises passing the latter and chlorine in a molar ratio within the range 1:1 to 1:4 into contact with a refractory material maintained at a temperature between 400–700° C. and coated with a chlorine-containing carbonaceous deposit.

2. A process for producing tetrachloroethylene from methylene chloride which comprises passing the latter and chlorine in a molar ratio within the range 1:1 to 1:4 into contact with a refractory material maintained at a temperature between 400–700° C. and coated with a chlorine-containing carbonaceous deposit, said deposit having been produced by passing a mixture of a chloro-hydrocarbon and chlorine in which the molar ratio of chlorine was less than unity into contact with the refractory material at a temperature resulting in the production of free carbon.

3. A process for producing tetrachloroethylene from methylene chloride which comprises passing the latter and chlorine in a molar ratio within the range 1:1 to 1:4 into contact with fragments of a refractory material maintained at a temperature between 400° and 500° C. and coated with a chlorine-containing carbonaceous deposit, said deposit having been produced by passing a mixture of methylene chloride and chlorine in which the molar ratio of chlorine was less than unity into contact with the fragments at a temperature within the range 400–700° C.

JOHN W. CHURCHILL.

REFERENCES CITED

The following references are of record in the file of this patent:

FOREIGN PATENTS

| Number | Country | Date |
|---|---|---|
| 58,273 | Austria | Mar. 26, 1913 |